Feb. 12, 1957 W. L. TRAFTON 2,781,073
FASTENER AND HOLDER TO ENGAGE A SLOTTED PANEL
Filed Oct. 23, 1952
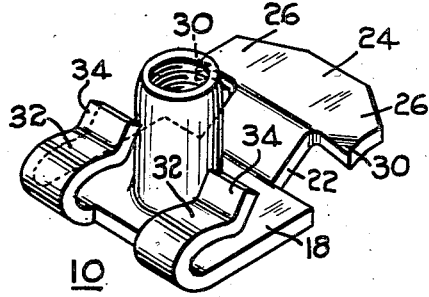
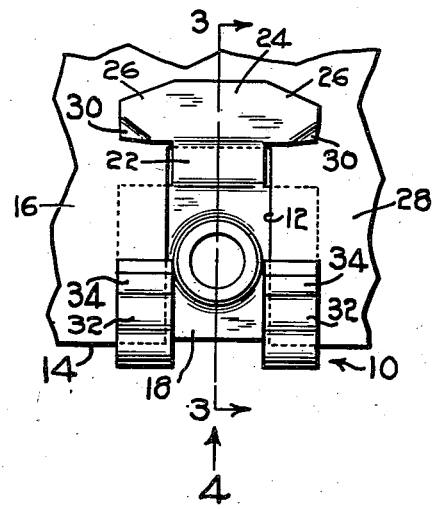
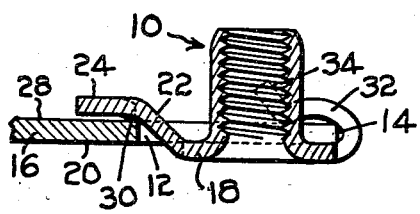
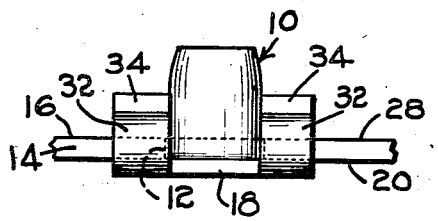
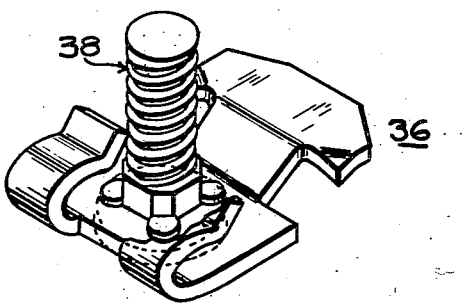
INVENTOR:
WARREN L. TRAFTON,
BY Robert E Ross
ATTORNEY.

United States Patent Office 2,781,073
Patented Feb. 12, 1957

2,781,073

FASTENER AND HOLDER TO ENGAGE A SLOTTED PANEL

Warren L. Trafton, Grosse Pointe, Mich., assignor, by mesne assignments, to United-Carr Fastener Corporation, Boston, Mass., a corporation of Delaware Application October 23, 1952, Serial No. 316,465

1 Claim. (Cl. 151—41.75)

This invention relates generally to fastening devices, and has particular reference to a fastener for assembly onto a panel to receive a threaded member.

The object of the invention is to provide a fastening device for assembly onto a panel edge to be securely retained thereon until a threaded member is assembled into the fastener.

A further object is to provide a one piece fastener for assembly into a slot in the edge of a panel which has means bearing against both sides of the panel and means gripping the edge of the panel to retain itself thereon until a threaded member is assembled therein.

Other objects of the invention will, in part, be obvious, and will, in part, appear hereinafter.

In the drawing,

Fig. 1 is a perspective view of a fastener embodying the features of the invention;

Fig. 2 is a top plan view of the fastener of Fig. 1 assembled into a slot in a panel edge;

Fig. 3 is a view in section taken on line 3—3 of Fig. 2;

Fig. 4 is a view of Fig. 2 as seen from the bottom;

Fig. 5 is a perspective view of a modified form of fastener embodying the features of the invention.

Referring to the drawing, there is illustrated a fastener 10, which is adapted for assembly into a slot 12 formed in the edge 14 of a panel 16.

The fastener 10 is preferably formed of a single piece of sheet metal, and comprises generally a base 18 having, in the embodiment of Figs. 1–4, a drawn barrel which extends upwardly from the base and is internally threaded to receive a bolt or the like (not shown) to enable the panel 16 to be attached to a support, or to enable some device to be attached to the panel. The base 18 is wider than the width of the slot into which the fastener is to be assembled, so that the base is able to span the slot and bear against one face 20 of the panel on both sides of the slot.

A tongue 22 is provided at one end of the base, which is narrower than the slot 12, and is inclined upwardly in relation to the plane of the base so as to pass through the slot. A panel bearing portion 24 is provided at the end of the tongue, and comprises laterally extending wings 26 to overlap the upper face 28 of the panel at the end of the slot and on opposite sides of the slot adjacent the end. The wings 26 may be provided with downwardly turned outer corners 30 for a purpose to appear hereinafter.

To provide means for engagement with the edge of the panel, a pair of spaced tongues 32 are provided at the other end of the base, which are curled back over the base and terminate in upwardly inclined end portions 34.

To assemble the fastener onto the panel, the fastener is slid into the slot 12 so that the wings 26 overlap the panel at the sides of the slot on the upper side of the panel, the base 18 overlaps the panel at the sides of the slot on the lower side of the panel, with the tongue 22 disposed in the slot. As the fastener is thus moved into the slot, the inclined ends 34 of the tongues 32 cam over the edge of the panel on each side of the slot. The tongues 32 are spaced from the base a distance less than the thickness of the panel, so that they must be sprung slightly away from the base to permit the edge of the panel to enter therebetween. The base 18 is thereby pulled tightly up against the lower side of the base, causing the downwardly turned corners 30 to bear tightly against the upper side of the panel, thereby creating further frictional engagement with the panel to assist in retaining the fastener thereon. Thereafter the fastener is ready to receive a bolt or the like to attach the panel to a support.

Referring now to Fig. 5, there is illustrated a fastener 36, which is substantially identical with the fastener 10, with the exception that instead of a drawn barrel, a bolt 38 is assembled onto the base and protrudes upwardly therefrom to engage a nut or the like.

It will be understood that in the case of either the fastener 10 or the fastener 38, the threaded means disposed on the base may extend either upwardly or downwardly.

It will also be understood that other types of threaded means, such as an embossed helical opening may be provided on the base. In other cases, non-threaded fastening means may be provided on the base such as a stud or other device for engagement by a threadless fastener.

Since certain other obvious modifications may be made in the device without departing from the scope of the invention, it is intended that all matter contained herein be interpreted in an illustrative and not in a limiting sense.

I claim:

A fastening device for assembly into a slot present in the edge of a panel comprising a base, said base being of a width sufficient to span the slot in the panel for bearing against one face of the panel on both sides of the slot; a tongue extending from one end of the base and being inclined upwardly from the plane thereof, said tongue being centrally positioned relative to said base and having a width less than that of said base, a panel bearing portion of a width substantially equal to that of said base disposed on the other end of the tongue in spaced relation to the plane of the base for bearing against the panel face opposite to that engaged by the base at the end of the slots and on both sides adjacent the end, the outer corners of said panel bearing portion along the edge joining said tongue being downwardly turned in the direction of the plane of the base to form panel biting portions, a pair of spaced tongues extending from the other end of the base and being turned back to extend over the base to frictionally grip the panel edge on opposite sides of the slot, and a threaded member secured to said base between said spaced tongues and extending away from said base in the same direction as the spaced tongues.

References Cited in the file of this patent

UNITED STATES PATENTS

| | | |
|---|---|---|
| 1,928,468 | Tinnerman | Sept. 26, 1933 |
| 2,236,850 | Hansman | Apr. 1, 1941 |
| 2,302,389 | Kost | Nov. 17, 1942 |
| 2,382,942 | Murphy | Aug. 14, 1945 |
| 2,566,886 | Hartman | Sept. 4, 1951 |
| 2,654,411 | Bedford | Oct. 6, 1953 |